Aug. 31, 1948.                H. E. MARSDEN                2,448,226
                    MOISTENING DEVICE FOR OFFSET PRESSES
Filed Jan. 15, 1945                                  11 Sheets-Sheet 1

Inventor,
H. E. Marsden
By Young, Emery & Thompson
                              Attys.

Aug. 31, 1948.  H. E. MARSDEN  2,448,226
MOISTENING DEVICE FOR OFFSET PRESSES
Filed Jan. 15, 1945  11 Sheets-Sheet 7

Fig. 8.

Inventor,
H. E. Marsden
By Young, Emery & Thompson
Attys.

Aug. 31, 1948. H. E. MARSDEN 2,448,226
MOISTENING DEVICE FOR OFFSET PRESSES
Filed Jan. 15, 1945 11 Sheets-Sheet 8

Inventor,
H. E. Marsden
By Young, Emery, Thompson
Attys.

Aug. 31, 1948.  H. E. MARSDEN  2,448,226
MOISTENING DEVICE FOR OFFSET PRESSES
Filed Jan. 15, 1945  11 Sheets-Sheet 10

Fig. 11.

Inventor,
H. E. Marsden
By Young, Emery & Thompson
Attys.

Patented Aug. 31, 1948

2,448,226

UNITED STATES PATENT OFFICE 2,448,226

MOISTENING DEVICE FOR OFFSET PRESSES

Horace Edwin Marsden, Snaresbrook, London, England

Application January 15, 1945, Serial No. 572,915
In Great Britain February 4, 1944

9 Claims. (Cl. 101—147)

This invention relates to lithographic printing presses and is more particularly concerned with providing an improved method of, and mechanism for, dampening the lithographic printing surfaces of the printing plate cylinders embodied in such machines.

In the art of lithographic printing as is well known the printing plate is prepared so that the printing design is in the form of a greasy deposit which has a great affinity for a greasy printing ink. The non-printing areas so long as they are kept damp repel this ink. The inked image is then impressed on to the material to be printed or in the case of offset lithographic printing onto rubber or other offset blanket from which it is in turn transferred to paper or other material to be printed. By a continued process of alternately dampening and inking the surface of the printing plate with balanced control of the amounts of water and ink the resulting print is maintained sharp and solid and the non-printing areas are kept clean.

In spite of all efforts made to utilize the means or refinements proposed to date with a view of avoiding the drawbacks of the dampening methods which according to common general knowledge are actually practiced, the progress made so far in that respect has been relatively small and the mechanical arrangements known to have been proposed as best suited to replace the present practice have not apparently yielded the hoped for results.

Now the present invention which is founded on substantial research and practical tests of the latest known proposals has been devised to provide useful improvements in the method likewise already suggested of dampening the surface of the lithographic printing plate or a part thereof with a dampening agent which is caused by a fluid pressure atomiser to be sprayed in a dense mist of fine particles on to the surface of the printing plate.

To this end according to this invention we propose to apply the dampening agent by a device comprising also a series of sprays but produced with the aid of nozzles of a particular construction extending across the effective width of the printing plate and adapted to spray a dense mist of fine particles of the atomized dampening agent on to the surface of the printing plate selectively, a selected portion of the printing surface being temporarily enclosed while rotating and the atomized liquid directed on to it under precise control of direction, area and density.

Briefly therefore the invention consists of a device for dampening the surface of a printing plate in a lithographic printing press with a dampening agent which is caused by a fluid pressure atomizer to be sprayed in a dense mist of fine particles on to the surface of the printing plate and is characterized by the provision for effecting the atomization of the dampening agent of spray nozzles, each constructed with passages fed separately with liquid under pressure and pressure gas from separate valve-controlled sources and arranged to discharge the liquid and gas into a mixing chamber forming the entry to an enclosed spray guard constructed to confine the action of the mixture or mist thus produced therein to a preselectable part of the printing plate.

The device is applicable to all types of lithographic printing presses both sheet-fed and reel-fed and also where only a portion of the plate is used or where the printing surface covers the full area of the plate.

According to one practical form of the invention water gravity fed, i. e., under pressure, supplied from a suitable source which is properly enclosed, and air under pressure supplied by an air compressor or a pump driven from any suitable part of the existing press drive are forced through the main feed pipes into the dampening device which is associated with the printing plate cylinder by being disposed for instance horizontally across the same but not in contact therewith. Fitted into this device are a number of spray nozzles at distances apart which are determined by the width of the spray from each so as to secure an equal spread of spray across the full width of the printing plate. By preference each nozzle is separately adjustable to control the amount of spray emerging therefrom and to cut off the spray completely. The depth of effective spray is controlled by adjustment of the nozzles and of their distance from the printing plate and the effective area sprayed can conveniently be controlled by guard plates above, below and at the ends of the device. For draining away any spray condensed on the sides of the guard plates means are provided for its removal.

For presses using the full area of the printing plate the arrangement includes means for providing a continuous spray. For presses using only a portion of the printing plate the arrangement includes additional mechanism adapted to cut off the spray from that portion of the plate which is not used for the printing.

All spray units may be connected to existing stop and start controls of the press so that the spray is caused to operate automatically as the press starts up and be automatically cut out as the press is stopped. In addition a separate cut-off of the water and air supply to the jets is preferably provided for use when the press is required to be run without operating the printing process.

It will be understood that while the method of this invention has been more particularly devised for applying clean water to the printing plate surfaces to be dampened it can also be utilised for applying other solutions or liquids to printing plate surfaces if so desired.

The practical application of the invention will now be more fully described with reference to the accompanying drawings in which—

Figure 1:
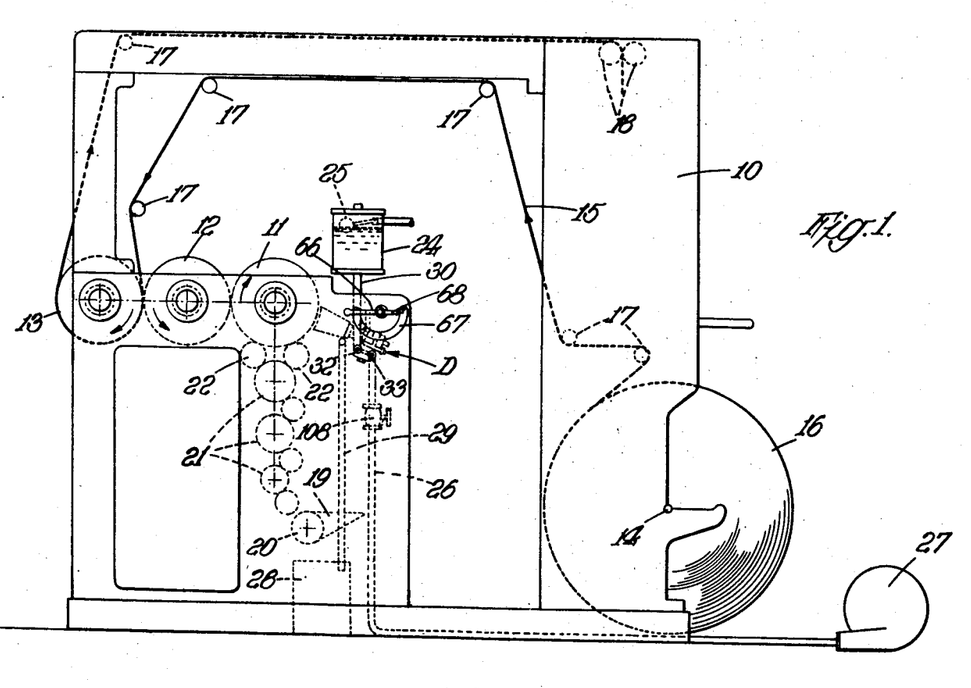
Fig. 1 is a side elevational view of a typical lithographic rotary offset, web printing, reel fed press provided with a water spraying device for dampening the printing plate cylinder according to the method of the present invention.
Figure 2:
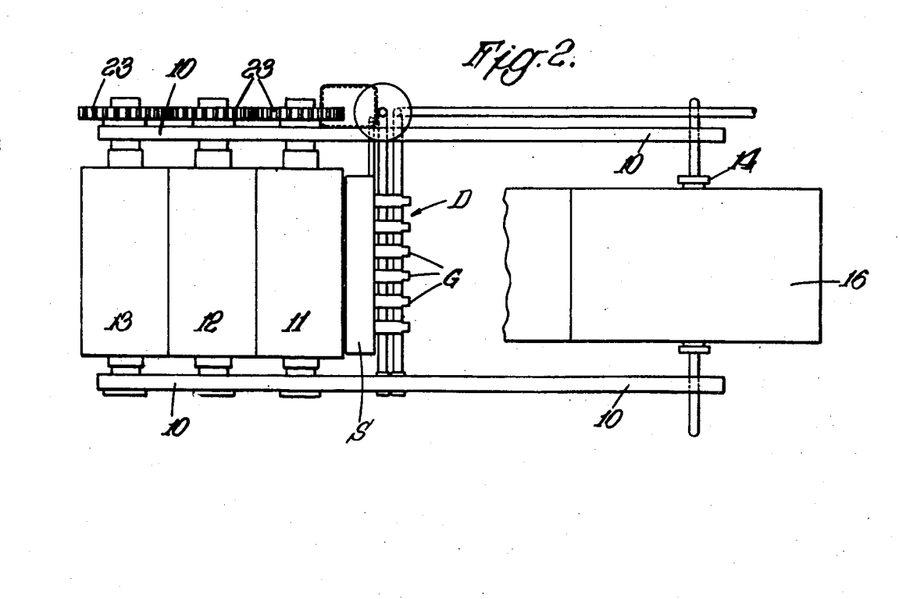
Fig. 2 is a plan view of the press shown in Fig. 1.

Referring to Figs. 1 and 2 the invention is shown applied to a lithographic, rotary offset web printing, reel fed offset press comprising longitudinal side frames 10 in which are journalled the requisite shafts carrying the printing plate cylinder 11, blanket or offset cylinder 12, impression cylinder 13 and reel carrier 14. A web 15 of paper or other material is fed from a reel 16, rotatably mounted upon the reel carrier 14, and is led by web guiding rollers 17 to pass between blanket cylinder 12 and impression cylinder 13 and then to return through a roller pair 18 to folding, cutting and delivery sections (not shown). The printing plate cylinder 11 is inked through the medium of an inking unit comprising an ink trough 19, trough roller 20, train of intermediate ink transfer rollers 21 and inking rollers proper 22 which contact the working face of the printing plate on cylinder 11. The cylinders 11, 12 and 13 with the power actuated members of the inking unit are driven in timed relation through a train of gears 23 which transmit the drive of an electric motor or other power unit (not shown). All other parts of the printing press which are not essential to the description of the present invention have been omitted for the sake of clarity, but it will be understood that the press may conveniently conform to known design in all respects excepting in the case of the dampening unit D which takes the place of the well known trough and roller dampening unit hitherto forming an indispensable part of all types of such presses.

The dampening unit D is supported between the frame members 10 and supplied with water through a pipe 30 from a gravity feed tank 24 which is supported upon one of the side frames 10 and may be conveniently filled from a water main through a ball valve cock 25. Compressed air is fed to the unit D through a pipe line 26 and a reducing valve 108 from a compressor 27 and waste water draining from the dampening unit may conveniently run through drain pipe 29 to a drain, or may be collected in the drain tank 28 set at ground level beneath the unit.

Referring now more particularly to Figs. 3–7 inclusive, the unit D comprises a series of water atomising spray devices hereinafter referred to as guns G mounted upon transverse compressed air and water manifolds 32 and 33 respectively which extend between the side frames 10 and are secured thereto so as to lie parallel with one another and the surface of the printing plate carried by cylinder 11, from which the manifolds are spaced as shown. The water manifold 33 is connected to water supply pipe 30 (Fig. 1) and the air manifold 32 is connected to the compressor pipe line 26 and these manifolds may have fixed positions and fixed connections to their respective supply pipes, as shown, or may be supported so as to be adjustable relative to the printing plate cylinder 11 and in this case the manifolds would be flexibly connected to their supply lines, e. g., by armored hose.

Figures 3, 4:
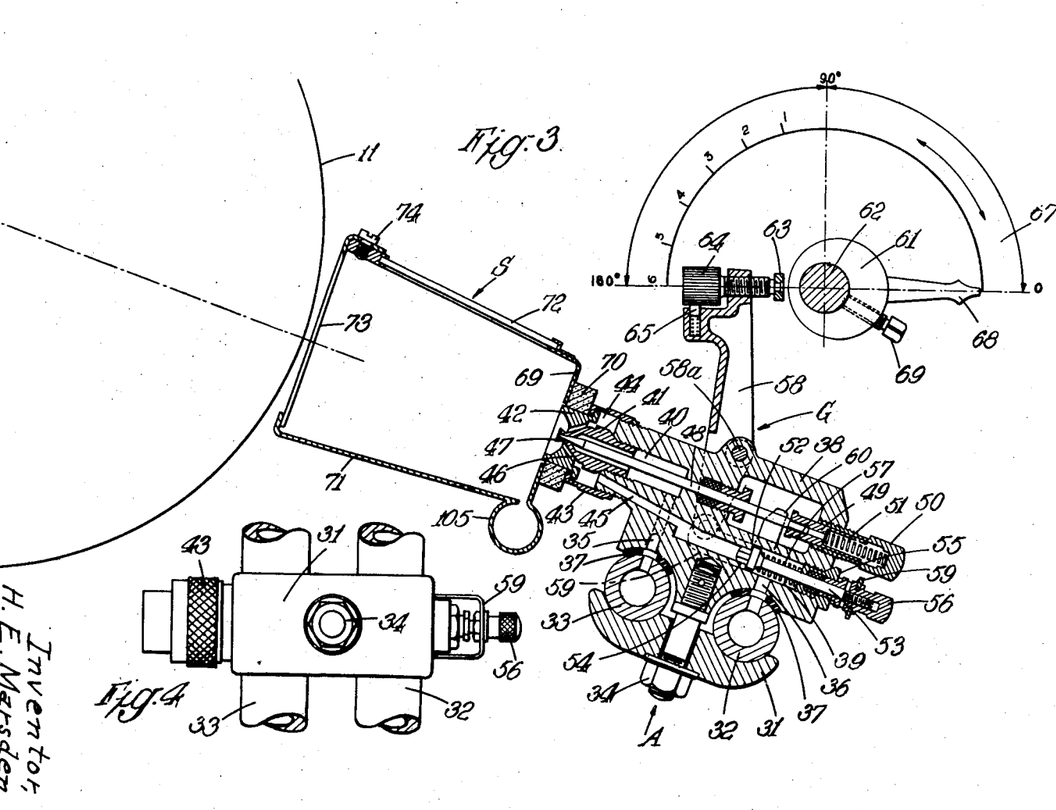
Fig. 3 is a detail, in sectional elevation drawn to a large scale, of the cylinder dampening device shown in Figs. 1 and 2.
Fig. 4 is a fragmentary detail view, looking in the direction of arrow A (Fig. 3)

The spray guns G are regularly spaced across the width of the printing cylinder 11 and are formed with saddle shaped under portions to seat upon the upper surfaces of the manifolds to which the guns are clamped in a removable manner by means of double saddle clamps 31 and threaded studs 34 which pass through the clamps and between the manifolds to enter tapped holes in the underneath centre portions of the bodies of the guns. Water inlet ports 35 and air inlet ports 36 provided in the saddle shaped portions of the gun bodies register with appropriate orifices in the upper walls of the manifolds 33 and 32 respectively, and packing washers 37 are disposed between the meeting surfaces of the gun bodies and manifolds so as to surround the registering ends of the orifices and ports therein.

Each spray gun G comprises a hollow body 38 formed with a primary air chamber 39, connected to air inlet port 36 and a water chamber 40 connected to water inlet port 35. An externally threaded atomising nozzle 41, of the needle valve kind, is screwed into the open end of the water chamber 40 and a dished and ported air diffusing block 42 is fitted over the tapered nose of the valve 41 and held in position by an internally flanged and threaded collar 43 which is screwed upon the externally threaded wall surrounding the water chamber 40. As shown in Fig. 3 the last described arrangement provides an annular secondary air chamber 44 which is connected to the primary air chamber 39 by means of an internal passage 45, and to ports 46 through which air from chamber 44 is forced to entrain water emerging from the jet 47 of nozzle 41. A tapered valve needle 48 enters nozzle 41 to control the flow of water from the valve, and the shaft of the needle passes through a packing gland and is secured to a cylindrical and partly hollow slide 49 which is slidably supported in a hollow set screw 50 threaded for engagement in a tapped hole formed in the end wall of the body 38 and provided with a knurled head for rotating the screw with the fingers when desired. The valve needle is yieldingly held in operative position by means of a compression spring 51 inserted in the hollow set screw 50 behind the end of the valve needle, and the spring pressure exerted upon the valve needle can readily be varied by rotation of set screw 50.

Admission of air from the primary air chamber 38 to secondary air chamber 44 is controlled by means of a piston valve 52 which is carried by a spindle 33 and controls the flow of air from inlet port 36 through the orifice plug 54. Spindle 53 passes through a packing gland 55 and the outer threaded end thereof is engaged by an adjusting screw 56 having a knurled portion for rotating the nut by means of the fingers to set the extent of movement of the air valve 52. A compression spring 57 interposed between the valve 53 and packing gland 55 serves yieldingly to hold the valve in the operative position.

The means for operating the air and water valves of each spray gun comprise a bifurcated rocking lever 58 which, straddles the gun body and is pivotally secured thereto by trunnion pins 58a so that the upper part of the lever projects upwards above the gun while the lower forked portions lying to either side of the body are linked to the free ends of a U-shaped connecting member 59. The closed end of member 59 is coupled to the adjusting screw 56 and valve spindle 53 and each limb of the member 59 is provided, intermediate its ends with an upwardly extending arm 60 having its upper end bent inwards to engage the front end of the valve needle slide 49. Thus, in the rocking movement of lever 58 in anticlockwise direction as viewed in Fig. 3, the air and water valves are opened against the force of their spring loading means, or are permitted to close when the lever is rocked in clockwise direction.

The levers 58 are rocked simultaneously through a control shaft 62 journalled in the frame members 10 so as to extend parallel to the manifolds 32, 33 and carrying cams 61 secured to the shaft by set screws 69 and set to engage adjustable cam followers 63 secured to the upper extremities of the rocking levers 58. The upper part of each lever 58 is formed as an angle bracket into which the threaded spindle of the cam follower 63 is screwed, and the further end of the cam follower spindle carries a serrated wheel 64 which is engaged by a spring loaded plunger pin 63 so that the cam follower spindle can readily be rotated to adjust the throw of the lever. The cam shaft 62 is rotated by handle 66 (Fig. 7) secured to an end of the shaft which projects through one of the frame members 10, and an indicator scale 67 and pointer 68 are provided visually to indicate the setting of the cams. The valve controlling means are set so that the first 90° rotation of the camshaft opens the air valves to an increasing degree and the next 90° rotation opens the water valves. It will be appreciated that adjustment of cam followers 63 relative to the cams 61 will vary the discharge of water through the needle valve 41, but is not intended to limit the maximum discharge of air which can be regulated by manipulation of the set screws 56, and reducing valve 108.

The air and water control valves of the spray guns are spring loaded so as to remain closed and so keep the guns inoperative until operated by the above described cam control means which are adapted simultaneously to operate the entire set of spray guns, but selected guns may be rendered inoperative by loosening the set screws 69 of the appropriate cams and displacing the latter laterally along shaft 62 to prevent the cams so displaced from engaging their cam followers 63 and rocking the associated levers 58.

Figure 5:
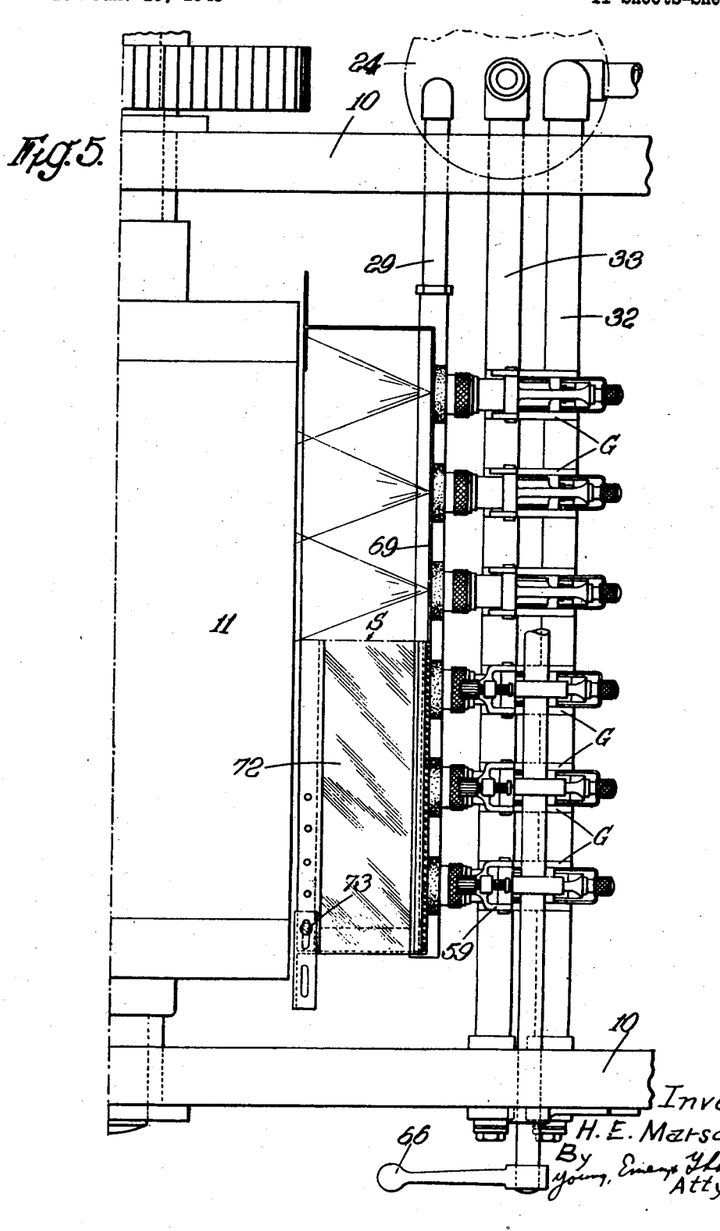
Figs. 5 and 6 are plan and elevational views respectively of a spray unit of the dampening device shown in the preceding views.
Figure 6:
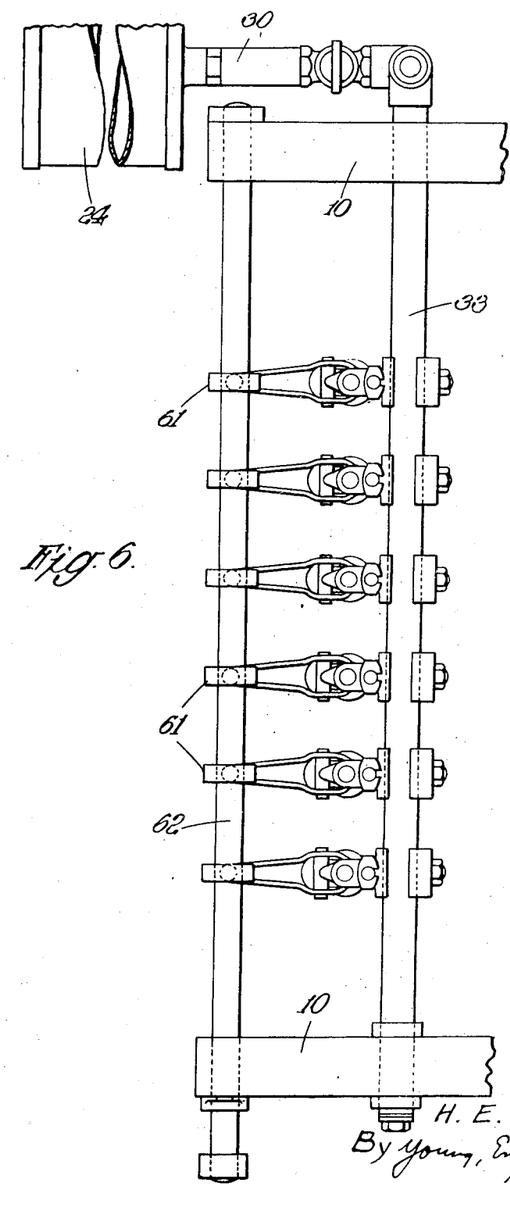
Figure 7:
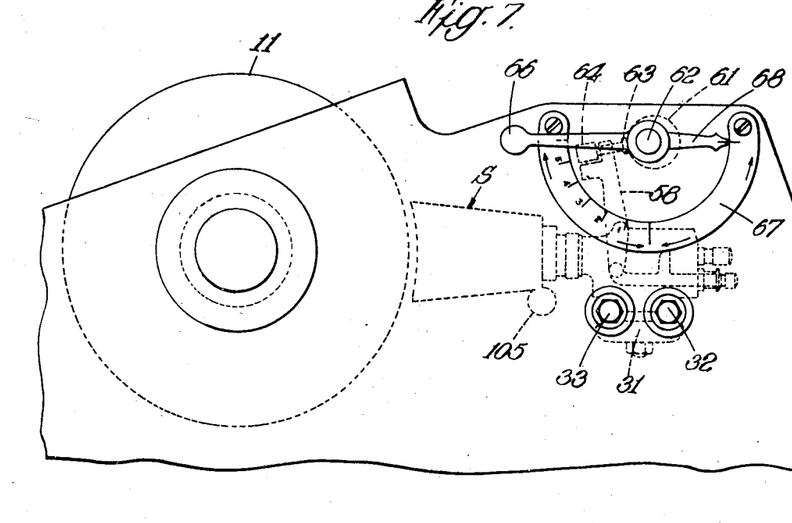
Fig. 7 is a fragmentary end elevational view of the calibrated control for the spray unit shown in Figs. 5 and 6, Figs. 8, 9 and 10 are detail views in elevation and plan of means for coupling the spray unit controls to the push button stop and start station of the electrical switchgear through which the motor drive of the press is operated.

The jets 47 of the spray guns are chosen to give a discharge which covers a quadrilateral area of the surface contacted thereby and the pitch of the guns set across the width of the printing plate cylinder is selected in relation to the width of the spray area so that the latter, in the zero of their maximum area of spread, i. e., at the printing plate surface, meet edge to edge without undue overlap, as shown in Fig. 5.

The spray from the guns G is enclosed in a spray guard S in the form of a box-like structure interposed between the spray guns and edge of the printing plate cylinder so as to extend across the entire width of the latter while supported upon suitable brackets secured to the side frames 10. That side of the spray guard which is adjacent the cylinder is open and the opposite side is formed with a wall 69 provided with apertures through which the guns project their spray. Packing washers 70 are interposed between the forward ends of the spray guns and wall 69. The bottom 71 of the spray guard is fitted with a gutter 105 which is connected to the drain pipe 29, while the top of the guard is formed with an inset glass panel 72 through which the sprays can be sighted. Adjustable side shields 73 adapted to close selected portions of the open side of the spray guard S are secured in place by set screws 74 which are screwed into the top front edge of the spray guard.

The setting and operation of the dampening device D is as follows:

If the printing plate occupies the entire width of cylinder 11, the whole set of spray guns G are set for operation and the open side of the spray guards S is left open along its entire width. On the other hand, if the printing plate is to occupy only part of the width of the printing plate cylinder then the spray guns which register with the blank part of the cylinder are rendered inoperative, by lateral displacement of the corresponding cams 61, so that the latter cannot contact their cam followers 63, and slide shields 73 are secured in position to cover the blank portion of the printing cylinder. The cam followers 63 of the operative guns are then adjusted so as individually to vary the moisture density of the sprays according to the proportion of ink surface to background in the area covered by each spray.

With the spray guns inoperative, the manual control will be set with the pointer 68 at zero on scale 67 (Figs. 1, 3 and 7) and the press can be run without dampening the printing plate cylinder. Prior to commencing the printing run, the printing plate may be tended and dressed in the usual manner and, if web, can then be quickly and clearly dried by directing streams of dry compressed air upon the rotating printing plate from the spray guns G. To this end the cam shaft 62 and cams 61 are rotated by handle 65 to rock levers 58 sufficiently to open the air valves 53 of the spray guns G without opening the corresponding water valves 41. With pointer 68 between zero and 90° upon scale 67 dry air only under steady pressure and in volume which varies according to the cam setting will emerge from the guns and impinge upon the printing plates.

When it is desired to commence printing, the cam shaft 62 is rotated so that pointer 68 moves between 90° and 180° upon scale 67. The levers 58 are thereupon rocked sufficiently to open water valves 41 and water is then drawn from spray gun jets 47 by air emerging from ports 46 which atomises the water and carries it forward in a mist-like spray which impinges upon the surface of the printing plate. It will be understood that the spray must be directed against the rotating printing plate surface with sufficient force to overcome the inherent tendency of the surface to throw back and reject the spray before the latter can lodge thereon. The requisite force of the spray will vary according to the rate of travel of the printing plate and moisture content of the spray and is best ascertained empirically under operating conditions.

The force of the sprays for any selected setting of the control means can be varied through adjustment of the air reducing valve 108. The moisture content of the sprays can be regulated by adjusting the throw of rocking levers 58 for given settings of the control cams, and the actual volume of the atomised sprays can be determined by setting the manual control according to the calibrations shown upon the air-water part of index 67.

As is well known to those skilled in the art, the surface of a metallic lithographic printing plate is usually grained for the retention of water and the fine mist of water which is deposited thereon by the dampening method of this invention is extremely efficacious as it is already highly atomised and therefore has a great affinity for the grained plate surface and readily clings thereto. Furthermore, by the use of positively controlled and finely adjustable fluid pressure atomising devices of the kind employing atomising spray jets the density of the moisture content of the sprays is maintained substantially constant at the surface of the printing plate. This factor is of great importance since it enables the surface of the printing plate to be effectively dampened with the projection of the minimum amount of excess water thereon so that emulsification of the ink surfaces and ink carried by the inking rollers and consequential deterioration in the standard of printed work produced by the press is greatly reduced and may be regarded for all practical purposes as eliminated.

Even with the dampening method of the present invention a certain amount of the water which is projected upon the printing plate is rejected, e. g., such water as falls upon the inked surfaces and this rejected water, together with all the moisture which is deposited upon the inner walls of the spray guard, drains into the gutter 105 at the bottom of the spray guard and runs away down drain pipe 29.

The spray guard S serves to confine the application of the spray to a selected part of the surface of the printing plate cylinder, to define the desired zone of application through which the printing plate surface is caused to pass, to protect such dampening zone from contamination by extraneous matter and from entry of cross air currents which might cause turbulence in the zone and interfere with the regular deposit of the misted water upon the printing plate, and to prevent undesired moisture from being deposited upon the printed work, inking rollers and other components of the press.

Although the operation of the dampening device may be effectively controlled by hand as above described, it is also within the ambit of this invention automatically to control the operation of the device by interlinking it with the press power drive controls. One manner of accomplishing the automatic control of the device when the latter is fitted to a press which is driven by an electric motor is to connect the push button station of the motor starter switchgear to electrically actuated mechanism which effects the movements of the spray gun controls. To this end in Figs. 8, 9 and 10, spray gun units and a spray guard similar to those above described with reference to Figs. 1-7 are shown adapted for both manually and automatically actuated cam control. In the drawings only one side of the arrangement is shown and only this side will be specifically described but it should be understood that the two sides corresponding to the two side frames 10 of the machine will be identical. In this arrangement the cam shaft 62 carrying control cams 61 is journalled in swinging bearing brackets 75 which are pivotally mounted upon a transverse shaft 76a fixed in and extending between the side frames 10.

Each bearing bracket 75 is formed with a semicircular enlargement or hub 76 to receive the calibrated index 67, while the handle 66 and pointer 68 are secured to the cam shaft close to the index 67 of the swinging bracket hub. The rear side of hub 76 is cammed with an abrupt rise 77. A three arm hubbed lever 80 is mounted upon the inner side of frame member 10 so as to rock upon a bearing stud 81 and is set in alignment with the enlargement of lever 75 so that a rotatable cam follower 82 mounted upon one arm of the lever 80 contacts the cammed edge of lever 75. A second arm 85 of lever 80 is connected by an articulated link 86 to the bar 84 of a solenoid 83 which is also secured to the inner side of frame member 10. The third arm 87 of lever 80 is connected to a tension spring 88 which is anchored to a fixed pin 89 projecting inwards from the frame member 10 and serves to restore the lever 80 and solenoid bar 84 to the inoperative position when the solenoid is de-energized. A similar tension spring 78 secured to the lower end of lever 75 and anchored to a fixed pin 79 which also projects inwards from frame 10 acts normally to hold lever 75 in the inoperative position. Solenoid 83 is electrically connected in circuit with the motor starter switch-gear so that the solenoid is energised and its bar 84 drawn to the right as viewed in Fig. 8, when the driving motor of the press is started.

Figure 8:
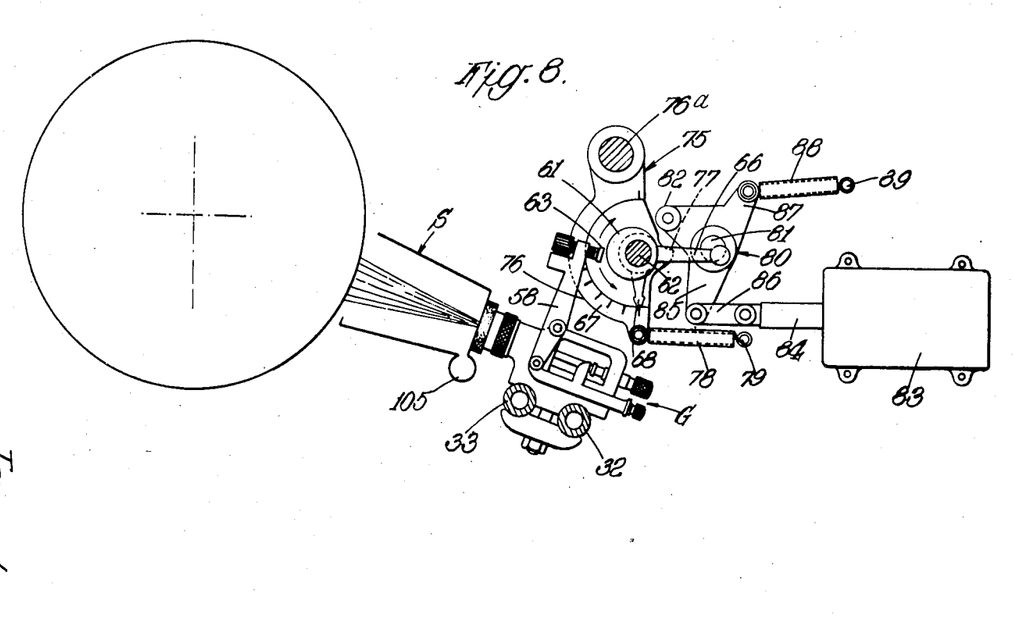
Figure 10:
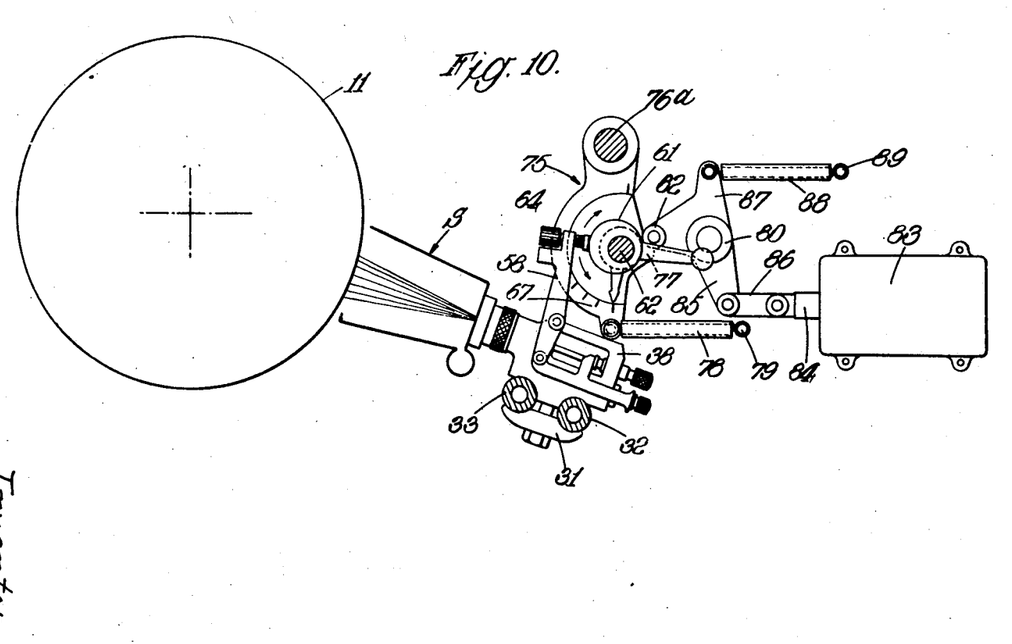

In the operation of the last described device, the collective control cam shaft 62 is manually rotated by handle 66, before the press is started, to set the cams 61 according to whether air or water spray is required. As shown in Fig. 8, the cams are set in the "full on" water spray position but by reason of the position in which levers 75 are held by springs 78 no contact is established between the cams 61 and cam followers 63 and the spray guns G therefore remain inoperative while the press is idle. When the motor starter switchgear (not shown) is actuated to start the electrical driving motor (not shown) solenoids 83 are energised and the bars 84 thereof drawn to the right as shown in Fig. 10. In the last described movement of the solenoid bars, levers 80 are rocked in anti-clockwise direction (as viewed in the drawings) against the force of the tension springs 85 and the cam followers 82 trail the cammed edge of brackets 75 and thrust against the cam rises 77 so that the brackets 75 and control cams 61 are pushed forward against the force of the springs 78 to engage the cam followers 63 and thrust the operating levers 58 forward to the "on" position, thus bringing the spray guns G into operation to the extent predetermined by the prior manual setting of the cam shaft 62 and cams 61. The spray guns are thus maintained in operation while the press is running but when the switch-gear is opened to stop the press, solenoids 83 are de-energised and the spray-controlling mechanism restored to inoperative position by springs 78 and 88.

Figure 11:
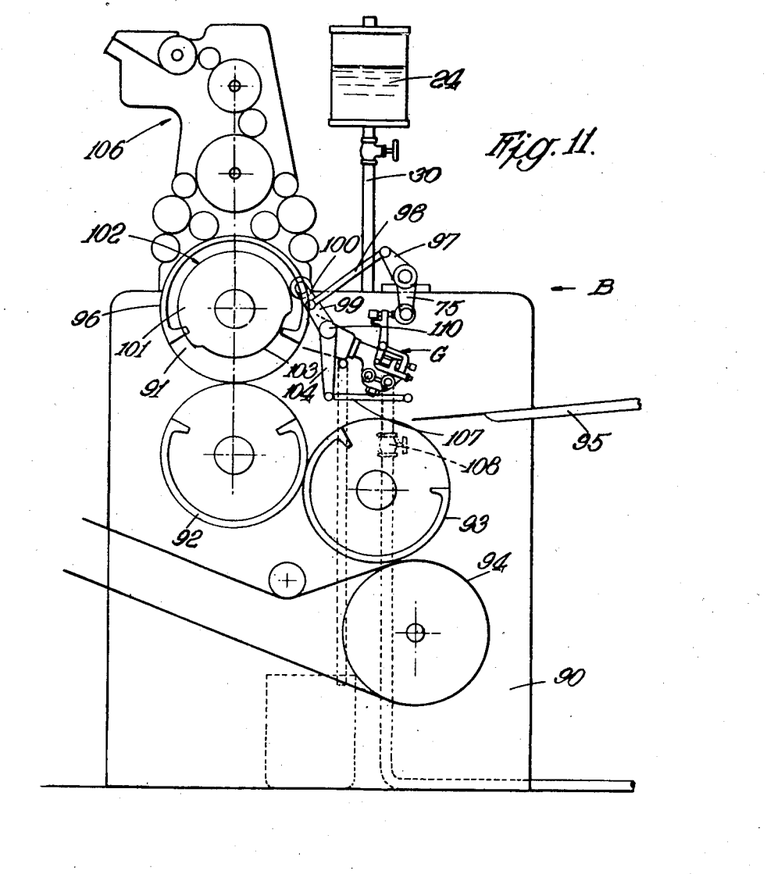
Fig. 11 is an elevational view of a sheet-fed lithographic offset press fitted with a water spraying device for dampening the working surface of the printing plate cylinder by the method of this invention.
Figure 12:
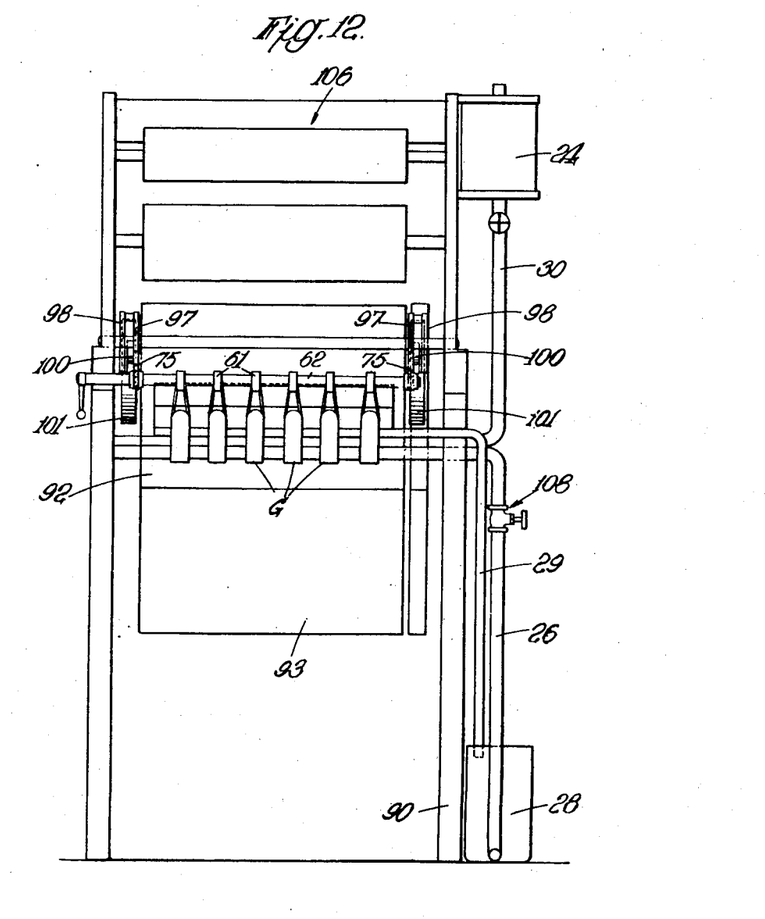
Fig. 12 is an elevational view at right angles to Fig. 11 and looking in the direction of arrow B (Fig. 11).

Figs. 11 and 12 illustrate, more or less diagrammatically, the application of the present invention to a typical sheet fed lithographic rotary offset press comprising side frame members 90 which serve to support printing plate cylinder 91 blanket cylinder 92, impression cylinder 93 sheet transfer cylinder 94, sheet feed table 95 and an ink roller system 106 for inking the printing plate 96 carried by cylinder 91.

The dampening of the printing plate 96 can be carried out according to the method of the present invention by the use of spray gun devices G as above described and these are fitted to the press complete with spray shield device S, water supply, compressed air supply and water drainage system all arranged and operating as described above with reference to the web printing, reel fed press. In the sheet fed type of press, however, the printing plate 96 extends around only part of the periphery of the cylinder 91 upon which it is mounted and, consequently, it is desirable in practice to adapt the spray gun devices to operate intermittently so that the surface moistening spray is cut off as the gap in the working surface of the printing plate 96 passes through the spraying zone.

Figure 9:
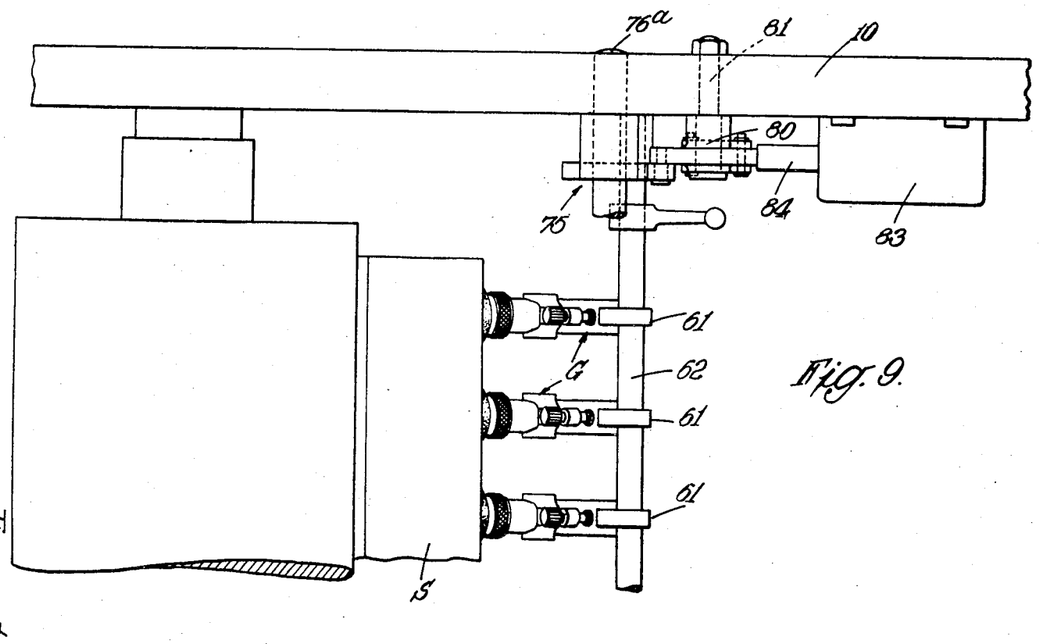

For the last mentioned purpose, the collective control cam shaft 62 carrying control cams 61 is mounted and arranged to operate in swinging brackets 75 in a similar manner to that above described with reference to Figs. 8, 9 and 10, but in this embodiment each bracket 75 or one of such brackets is rigidly connected to an arm 97 which is connected by a link 98 to one arm 99 of a bell crank pivotally mounted upon a stub shaft 110 which is fixed to the side frame 10. The second arm 104 of the bell crank is connected to a tension spring 107 anchored to the side frame 10 and arm 99 carries a cam follower 100 which is urged by a ring 107 into contact with the edge of a cam disc 101 keyed to the shaft of printing plate cylinder 91. The cammed edge of disc 101 is formed with a rise 102 and valley. 103 set in relation to the printing plate surface so that as the latter rotates and passes through the spray zone cam follower 100 contacts cam rise 102 and brackets 75 are rocked clockwise (as viewed in Fig. 11) to operate the spray guns. When the printing plate surface has practically passed through the spraying zone cam follower 100 drops into cam valley 103 and the brackets 75 are rocked anti-clockwise by springs 107 to cut out the spray guns as the gap in the printing plate surface enters the spraying zone.

It will be understood that the automatic device for controlling the operation of the spray devices can readily be modified, if desired, to function with the last described embodiment of the dampening device.

The invention has been described above more particularly with reference to one printing unit of a rotary offset press but it will be obvious that the invention can be applied with equal facility to each printing unit or section of a multi-stage rotary offset press.

I claim:

1. In a lithographic printing press, means for spraying a dampening agent in a dense mist of fine particles directly on to the surface of the printing plate comprising a series of fluid pressure atomizing units each provided with a valve for regulating the admission of compressed air, associated with a valve for regulating the admission of water under pressure in combination with means for adjusting said valves, means for operating said valves in each unit in predetermined succession, means for actuating said operating means, mechanism for adjusting and controlling the operation of said actuating means, and means for varying the function of said control mechanism for controlling the operation of any preselected number of said units independently of the movement of said control mechanism.

2. In a lithographic printing press, a means for spraying a dampening agent in a dense mist of fine particles directly on to the surface of the printing plate comprising a series of fluid pressure atomizing units each provided with a valve for regulating the admission of compressed air associated with a valve for regulating the admission of water under pressure to said unit each of said valves having a spindle in combination with a sliding member connected to the spindle of the air admission valve for operating said valve, a finger piece forming part of said sliding member for operating the spindle of the valve for regulating the admission of water, means adjustable on said latter spindle to a variable distance from said finger piece, for regulating said admisison with a regulable time lag, means for actuating said sliding member, and means for varying the extent of movement of said sliding actuating means for each atomizer unit.

3. In a lithographic printing press, means for spraying a dampening agent in a dense mist of fine particles directly on to the surface of the printing plate comprising a series of fluid pressure atomizing units each provided with a valve for regulating the admission of compressed air associated with a valve for regulating the admission of water under pressure to each said unit, each of said valves having a spindle in combination with a sliding member connected to the spindle of the air admission valve for operating said valve, a finger piece forming part of said sliding member for operating the spindle of the valve for regulating the admission of water, a sleeve adjustable on said latter spindle for engaging with said finger piece after an adjustable time interval, a rocking arm linked to said sliding member of each atomizing unit, means for operating said rocking arm, and means for adjusting the operative relation between said rocking arm and its operating means for controlling the extent of movement of said rocking arm for the actuation of said sliding member to a preselected extent.

4. In a lithographing printing press, means for spraying a dampening agent in a dense mist of fine particles directly on to the surface of the printing plate comprising a series of fluid pressure atomizing units each provided with a valve for regulating the admission of compressed air associated with a valve for regulating the admission of water under pressure to each said unit, each of said valves having a spindle in combination with a sliding member connected to the spindle of the air admission valve for operating said valve, a finger piece forming part of said sliding member for operating the spindle of the valve for regulating the admission of water, a sleeve adjustable on said latter spindle for engaging said finger piece after a regulable time interval, a rocking arm linked to said sliding member of each atomizing unit, a cam for operating said rocking arm, a cam follower associated with said arm, and means for adjusting said cam follower in relation to said cam for varying the extent of movement of said rocking arm and thereby the extent of movement of the valve actuating slide for each atomizing unit.

5. In a lithographic printing press, means for spraying a dampening agent in a dense mist of fine particles directly on to the surface of the printing plate comprising a series of fluid pressure atomizing units each provided with a valve for regulating the admission of compressed air associated with a valve for regulating the admission of water under pressure to each of said units, each of said valves having a spindle in combination with a sliding member connected to the spindle of the air admission valve for operating said valve, a finger piece forming part of said sliding member for operating the spindle of the valve for regulating the admission of water, a sleeve adjustable on said latter spindle for engaging with said finger piece after a regulable time interval, a rocking arm linked to said sliding member of each atomizing unit, a cam for operating said rocking arm, a cam follower associated with said arm, a cam shaft carrying said cam, means for adjusting said cam on said shaft for throwing said cam in and out of operative engagement with said cam follower, and means for operating said cam shaft through predetermined stages for varying the extent of movement of said rocking arm and thereby the operation of the air and water valves by a corresponding displacement of the respective valve actuating sliding member.

6. In a lithographic printing press, means for spraying a dampening agent in a dense mist of fine particles directly on to the surface of the printing plate comprising a series of fluid pressure atomizing units each provided with a valve for regulating the admission of compressed air associated with a valve for regulating the admission of water under pressure to each of said units, each of said valves having a spindle in combination with a sliding member connected to the spindle of the air admission valve for operating said valve, a finger piece forming part of said sliding member for operating the spindle of the valve for regulating the admission of water, a sleeve adjustable on the spindle of said latter valve for engaging said finger piece after a regulable time interval, a rocking arm linked to said sliding member of each atomizing unit, a cam for actuating said rocking arm, a cam follower associated with said arm, a cam shaft carrying said cam, means for adjusting said cam on said shaft and for throwing said cam in and out of operative engagement with said cam follower, and a controlling scale for predetermining the measure of the actuation of said rocking arm and thereby the operation of the valves of said atomizing unit for a pre-selected condition of the spray of said unit.

7. In a lithographing printing press means for spraying a dampening agent in a dense mist of fine particles directly on to the printing plate comprising a series of fluid pressure atomizing units, adjustable air and water valves in each unit supplied severally with air and water individually under pressure in combination with a spray guard between said units and said printing plate for directing the spray of the entire series of said units directly on to said plate, means for adjusting said spray guard for confining the spray to a pre-selected portion of said plate, a valve actuating member associated with each said unit for operating said valves in predetermined succession, a series of rocking arms one associated with the valve operating member of each said unit, a cam shaft for controlling the operative condition of the entire series of said rocking arms, a series of cams on said cam shaft corresponding to the series of said rocking arms, means associated with each of said rocking arms for adjusting the operative relation thereof to a cam on said shaft, means for actuating said cam shaft for operating the entire series of atomizing units to the extent predetermined by the adjustment of said rocking arms, and means for throwing said cam individually into and out of operative relation with any pre-selected number of said rocking arms for the actuation of a corresponding number of atomizing units according to the area of printing plate confined by said spray guard.

8. In a lithographic printing press means for spraying a dampening agent in a dense mist of fine particles directly on to the surface of the printing plate comprising a series of fluid pressure atomizing units of the type described in combination with means for adjusting the operative condition of any desired number of units in said series individually, means for operating and predetermining the length of the operation of said pre-adjusted units for the control of the water content in the spray of said units, means for the control of the volume of said spray during a given time of said operation and means associated with the shutting down operation for cutting off all water automatically before any appreciable reduction of the air supply.

9. In a lithographic printing press means for spraying a dampening agent in a dense mist of fine particles directly on to the surface of the printing plate comprising a series of fine adjustable fluid pressure atomizing units, control mechanism common to all said units, means associated with each said unit for the individual control of the volume of air and water supplied to each said unit in a predetermined order, and means for the automatic release of a variable volume of air to a group of said units prior to the release of any water independently of the volume provided by the actuation of said control mechanism.

HORACE EDWIN MARSDEN.

REFERENCES CITED

The following references are of record in the file of this patent:

UNITED STATES PATENTS

| Number | Name | Date |
|---|---|---|
| 1,377,769 | Geiger et al. | Feb. 22, 1938 |
| 1,719,017 | Moe | July 2, 1929 |
| 1,798,850 | Moe | May 31, 1931 |
| 1,834,169 | Moe | Dec. 1, 1931 |
| 2,101,164 | Bramson et al. | Dec. 7, 1937 |
| 2,108,984 | Grembecki | Feb. 22, 1938 |
| 2,112,546 | Smart | Mar. 29, 1938 |
| 2,299,974 | Grobecker | Oct. 27, 1942 |
| 2,264,523 | Gustafsson et al. | Dec. 2, 1941 |
| 2,389,730 | Iler | Nov. 27, 1945 |